No. 635,829. Patented Oct. 31, 1899.
E. B. WESTON & W. W. JACKSON.
AUTOMATIC REGULATING WEIR.
(Application filed July 29, 1899.)
(No Model.) 2 Sheets—Sheet 1.

No. 635,829. Patented Oct. 31, 1899.
E. B. WESTON & W. W. JACKSON.
AUTOMATIC REGULATING WEIR.
(Application filed July 29, 1899.)
(No Model.) 2 Sheets—Sheet 2.

WITNESSES:
F. N. Roehrich
James C. Reilly

INVENTORS
Edmund B. Weston
Walter W. Jackson
BY
J. E. Hinton Hyde
ATTORNEY

UNITED STATES PATENT OFFICE.

EDMUND B. WESTON AND WALTER W. JACKSON, OF PROVIDENCE, RHODE ISLAND, ASSIGNORS TO THE NEW YORK FILTER MANUFACTURING COMPANY, OF NEW YORK, N. Y.

AUTOMATIC REGULATING-WEIR.

SPECIFICATION forming part of Letters Patent No. 635,829, dated October 31, 1899.

Application filed July 29, 1899. Serial No. 725,449. (No model.)

*To all whom it may concern:*

Be it known that we, EDMUND B. WESTON and WALTER W. JACKSON, citizens of the United States, residing in Providence, county of Providence, and State of Rhode Island, have invented an Improvement in Automatic Regulating-Weirs, of which the following is a specification.

The invention relates to an automatic regulating-weir especially designed and adapted, among other uses, to be employed in connection with mechanical filters of the pressure type in order to secure a constant rate of discharge of filtered water from the weir tank or chamber irrespective of the pressure of the water column in such weir tank or chamber and irrespective of the condition of the filter-bed. The device may, however, be used with an irrigation plant designed to supply unvarying amounts of water under pressure from the source of supply to the various consumers, or, again, to the regulation of the water flow under pressure for power purposes, or, still again, to control the supply of solutions in chemical-manufacturing plants.

It is well known to those skilled in the art that when water first begins to flow through the filter-bed of a filter the bed is easily permeated and the rate of discharge is much greater for the same pressure than can be maintained after the filter-bed has become less permeable through the collection of the coagulant generally used in filtering plants or the impurities removed from the water and lying on and within the filtering medium. Practice has determined a limiting velocity or rate of discharge for each unit of area of the surface of the filtering medium, and this rate must not be exceeded if the efficiency of the filter in the removal of bacteria and other impurities is to be maintained. It is not only necessary to place a maximum limit upon the rate of discharge, but it is also very desirable to preserve a constant rate of flow of the fluid, and although variations in this rate may not rise as high as the maximum limit any considerable variation is still very detrimental to the efficiency of the apparatus. Changes of rate cause changes in pressure on the filtering-bed, and, however slight, will tend to cause scouring action. Our invention is designed to obviate the disadvantages referred to and to secure a predetermined constant rate of discharge of filtered fluid from the filtering apparatus or source of supply.

Our invention is illustrated in the accompanying drawings, in which—

Figure 1 shows, partly in section and partly in elevation, a module through which the water flows upward under pressure. Fig. 2 shows, partly in section and partly in elevation, a form of module through which the water flows under pressure to the discharge-pipe at an angle. Fig. 3 shows, partly in section and partly in elevation, a modification of the apparatus illustrated in Fig. 1.

Similar letters of reference refer to similar parts throughout the several views, and the arrows show the direction of flow.

Referring to the drawings, Fig. 1, P represents the inlet-pipe for the filtered or other water, and A represents the casing of the controller or module proper. G G are guides in the top and bottom of the controller, respectively, and preferably situated at the center thereof. The stem I operates in the guides G G and has mounted upon it a compound disk D, situated within the module A, so as to reciprocate with the stem. E is the discharge-pipe. Mounted upon the disk-stem I there is a jointed or elbow lever L, which operates the butterfly or other balanced valve V. This valve V is situated in the inlet-pipe P and is mounted upon a shaft which has its bearings in the walls of the pipe P.

Figure 1:
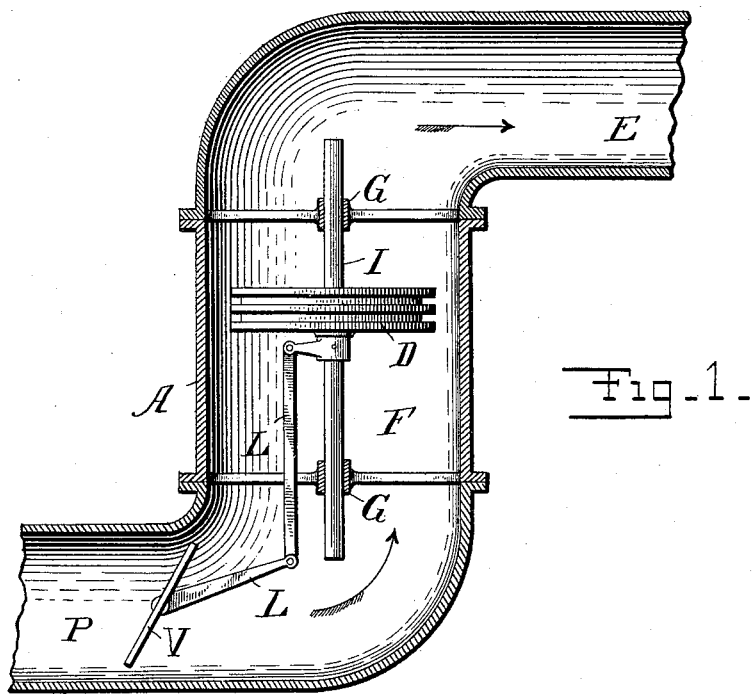

While we have illustrated in the drawings the valve V as being situated on that side of the disk D which is upstream of the disk D or toward the source of supply of water, it will be understood that the device will be operative and the supply kept constant by placing this valve downstream of the disk D or toward the discharge.

The operation of our device is as follows: The orifice for the discharge of the water from the module is the area between the disk D and the walls of the module. The friction of a certain rate of discharge through this orifice determines the difference of pressure on the two sides of the disk, this difference being balanced by the weight of the disk plus the stem I and link or rack L. For a given discharge this difference of pressure is constant. If the discharge increases under increased pressure of the water-supply, the friction increases, and the excess of pressure being unbalanced causes the disk to move in the direction of flow, thus reducing the opening of the valve V until the discharge is again reduced to the rated capacity. If, on the other hand, the pressure in the pipe P falls or the back pressure in the outlet-pipe E is increased, the discharge decreases, the friction through the orifice decreases, and the disk falls back against the direction of flow, thereby opening the valve V and admitting water until the rated capacity is again established.

Figure 2:
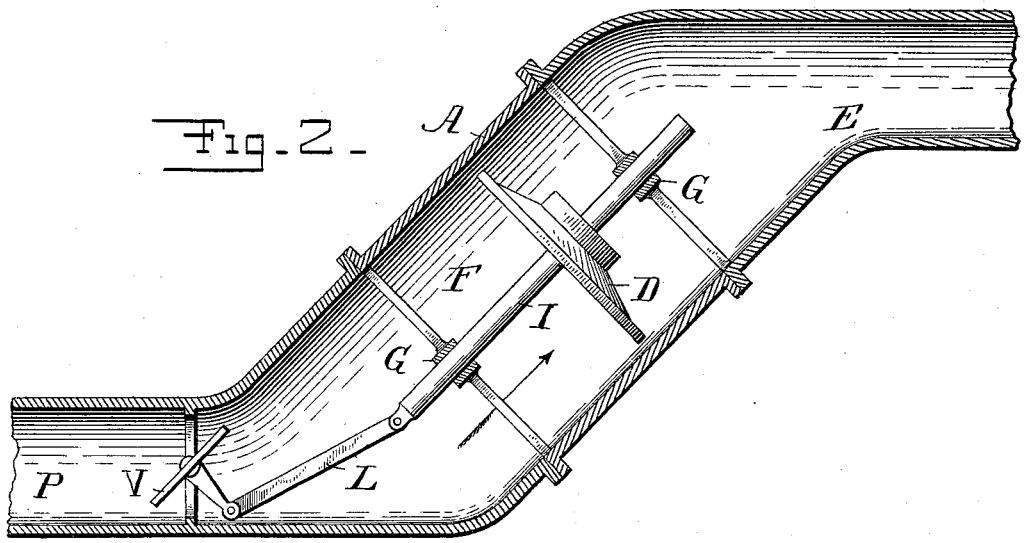
Fig. 2 is similar to Fig. 1, with the exception that it shows the module arranged at an angle and not perpendicular and the disk of a different form.
Figure 3:
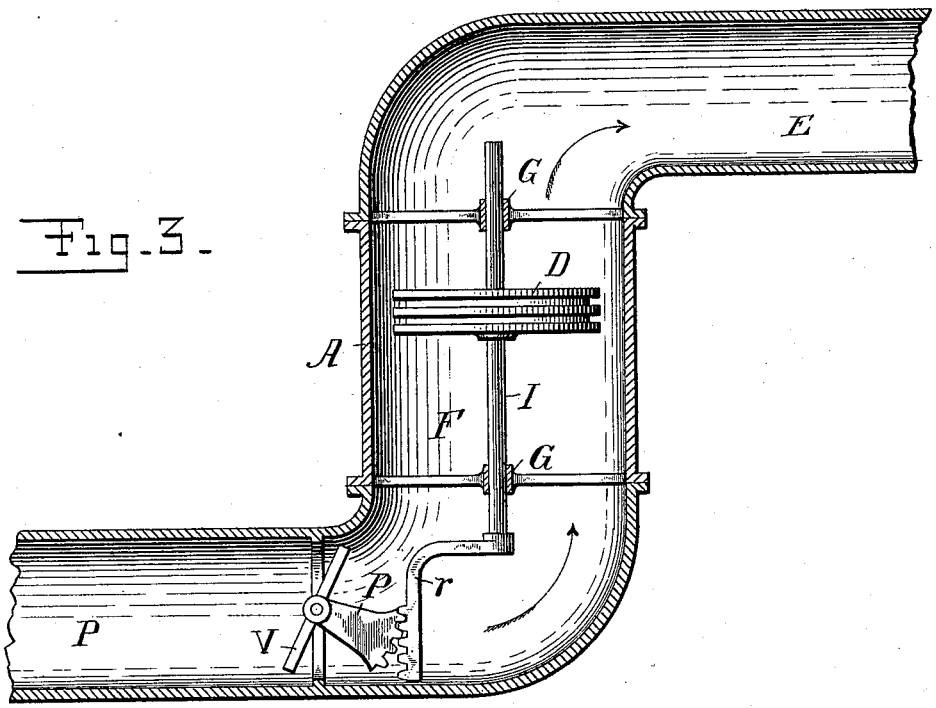
Fig. 3 is similar to Fig. 1, except that for the elbow-lever L there are substituted a rack $r$ and pinion $p$, the latter being in the form of a segment mounted upon the shaft upon which the valve V operates.

The disk may have a single edge, as in Fig. 2, or it may have scores in its perimeter or be composed of several disks superimposed and separated slightly, as in Figs. 1 and 3. The disk may have rounded edges as well. Further, the disks may be of any suitable form—square, oblong, or irregular—and the discharge-tube may of course be of any desirable shape in cross-section, the fundamental idea being that the disk, and thereby the orifice, may traverse the module without friction or retardation of any kind and may keep the area between the disk and the walls of the module or discharge-tube constant.

The rated capacity of the instrument may be altered by changing the weight of the disk or by changing the area of the orifice between the disk and the walls of the discharge-tube by enlarging or contracting the diameter of the disk.

It is obvious that various modifications may be made in the apparatus without departing from our invention. Thus other forms of lever may be substituted for the lever L and other devices used in place of the rack and pinion shown in Fig. 3. So also any suitably-balanced valve may be substituted for the butterfly-valve V, and the location of the parts permits of some variation.

Having thus described our invention, what we claim is—

1. In a module, the combination of an inlet balanced valve operated by a lever connected to a sliding stem traversing the controller-chamber, said stem having a submerged disk mounted thereon, and a discharge-tube, substantially as described.

2. In a module, the combination of an inlet balanced valve operated by a lever connected to a sliding stem traversing the controller-chamber, said stem having a weighted submerged disk mounted thereon; and a discharge-tube; substantially as described.

3. In a module, the combination of an inlet balanced valve operated by a pinion, and a rack connected to a sliding stem traversing the controller-chamber, said stem having a submerged disk mounted thereon; and a discharge-tube; substantially as described.

4. In a module, the combination of an inlet balanced valve operated by a lever connected to a sliding stem traversing the controller-chamber, said stem having a submerged compound disk, consisting of two or more superposed disks, mounted thereon; and a discharge-tube; substantially as described.

5. In a module, the combination of an orifice traversing a tube through the movement of a submerged disk mounted upon a stem, said stem being connected to a lever operating a balanced inlet-valve, substantially as described.

EDMUND B. WESTON.
WALTER W. JACKSON.

Witnesses:
GEO. H. REMINGTON,
C. E. GREENE.